United States Patent
Joeng (10) Patent No.: US 8,880,312 B2
(45) Date of Patent: Nov. 4, 2014

(54) CLUTCH ASSEMBLY FOR ELECTRIC 4-WHEEL DRIVE SYSTEM

(71) Applicant: Hyundai Motor Company, Seoul (KR)

(72) Inventor: Ji-Yoel Joeng, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/957,758

(22) Filed: Aug. 2, 2013

(65) Prior Publication Data
US 2014/0188358 A1    Jul. 3, 2014

(30) Foreign Application Priority Data
Dec. 28, 2012    (KR) .......................... 10-2012-0157470

(51) Int. Cl.
*F16D 41/07*    (2006.01)

(52) U.S. Cl.
CPC ....................................... *F16D 41/07* (2013.01)
USPC ............................................................ 701/68

(58) Field of Classification Search
USPC .......... 701/67, 68, 69, 22; 180/292, 293, 294, 180/295, 65.21, 65.1; 280/192, 238; 192/3.24, 3.32, 3.55, 12 R
See application file for complete search history.

(56) References Cited

U.S. PATENT DOCUMENTS

| | | | | |
|---|---|---|---|---|
| 5,445,255 A | * | 8/1995 | Rutke et al. | 192/45.1 |
| 6,290,044 B1 | * | 9/2001 | Burgman et al. | 192/46 |
| 6,554,741 B2 | * | 4/2003 | Saito | 477/120 |
| 8,011,464 B2 | * | 9/2011 | Samie et al. | 180/65.6 |
| 2005/0130789 A1 | * | 6/2005 | Samie et al. | 475/284 |
| 2006/0213738 A1 | * | 9/2006 | Moser et al. | 192/21.5 |
| 2007/0278061 A1 | * | 12/2007 | Wittkopp et al. | 192/43.1 |
| 2008/0000747 A1 | * | 1/2008 | Saka | 192/43.2 |
| 2010/0063693 A1 | * | 3/2010 | Lee et al. | 701/54 |
| 2011/0287892 A1 | * | 11/2011 | Cullen et al. | 477/107 |
| 2012/0097467 A1 | * | 4/2012 | Maeno et al. | 180/206.7 |
| 2013/0133480 A1 | * | 5/2013 | Donnelly | 74/720 |

FOREIGN PATENT DOCUMENTS

| | | |
|---|---|---|
| JP | 2004262345 A | 9/2004 |
| JP | 3610970 B2 | 1/2005 |
| JP | 4093097 B2 | 5/2008 |

* cited by examiner

*Primary Examiner* — John R Olszewski
*Assistant Examiner* — James M McPherson
(74) *Attorney, Agent, or Firm* — Edwards Wildman Palmer LLP; Peter F. Corless (57) ABSTRACT

A clutch assembly is provided for an electric 4-wheel drive system. The clutch assembly selectively blocks power delivered from a drive element of a motor to a driven element of a rear wheel and includes a one-way clutch movably installed between the drive element and the driven element, a fork member movably installed in a clutch housing and brought into sliding contact with the external circumference of the one-way clutch, and an actuator installed in the clutch housing and configured to provide forward working force and backward working force to the fork member.

9 Claims, 8 Drawing Sheets

CLUTCH ASSEMBLY FOR ELECTRIC 4-WHEEL DRIVE SYSTEM

CROSS-REFERENCE TO RELATED APPLICATION

This application claims under 35 U.S.C. §119(a) priority to and the benefit of Korean Patent Application No. 10-2012-0157470 filed in the Korean Intellectual Property Office on Dec. 28, 2012, the entire contents of which are incorporated herein by reference.

BACKGROUND (a) Field of the Invention

The present invention relates to an electric 4-wheel drive system and, more particularly, to a clutch assembly for the electric 4-wheel drive system for selectively connecting and blocking the delivery of power to the drive element of a motor and the driven element of a wheel, and a method of controlling the operation of the same.

(b) Description of the Related Art

In general, an electric 4-Wheel Drive (e-4WD) system is an apparatus capable of simultaneously obtaining a 4WD function and a hybrid electric vehicle (HEV) function by driving the rear wheel of a vehicle having a front engine front-wheel drive by way of a motor.

The electric 4-wheel drive system drives the motor by way of redundant power of the engine. The electric 4-wheel drive system is now available in some cars and mass-produced by automobile makers.

The electric 4-wheel drive system can be achieved in a more cost-effective manner as compared to a hybrid vehicle or a fuel cell vehicle with a high capacity battery. The electric 4-wheel drive system obtains necessary power from a high-capacity electric generator, and drives the motor by using the power. In a vehicle utilizing an electric 4-wheel drive system, the engine and the power of a transmission are connected to a front wheel. Such a vehicle includes an electric generator for converting mechanical energy, that is, the redundant power of the engine, into electrical energy. A motor and a decelerator driven by electrical energy generated from the electric generator are disposed on a part of a rear wheel of the vehicle, and outputs of the motor and the decelerator can be delivered to the driven element of the rear wheel through a drive element.

As described above, the electric 4-wheel drive system can improve fuel consumption because the weight of the vehicle is reduced by omitting a propeller shaft, and can minimize power loss when the vehicle is driven.

Figure 1:
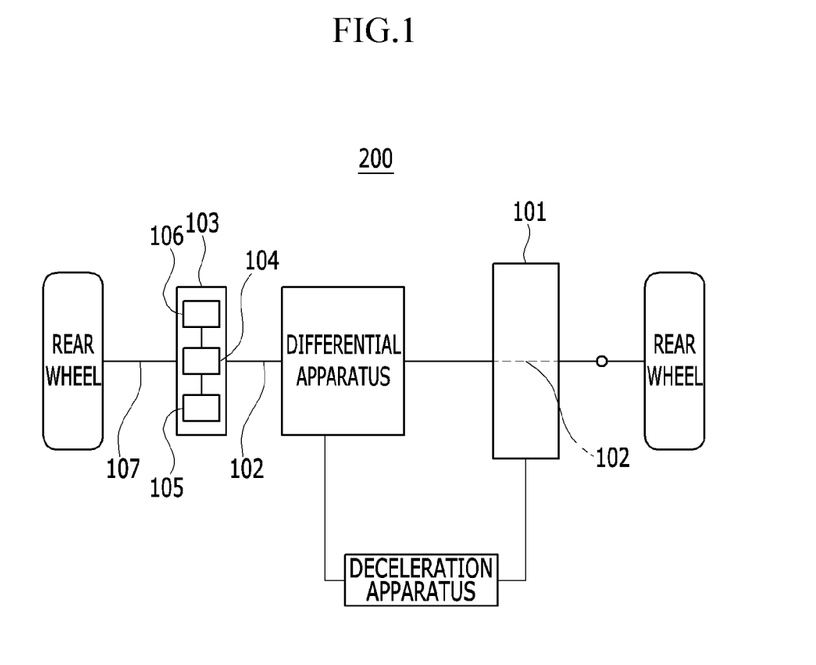
FIG. 1 (RELATED ART) is a block diagram schematically showing an example of a known electric 4-wheel drive system.

As shown in FIG. 1 (RELATED ART), an electric 4-wheel drive system 200 is particularly useful when a vehicle speed is 130 km/hour or more, where the electric 4-wheel drive system 200 includes a clutch 103 for selectively blocking power delivered from a drive element 102 of a motor 101 to a driven element 107 of a rear wheel.

In particular, the clutch 103 releases a connection between the drive element 102 of the motor 101 and the driven element 107 of the rear wheel so that the driving torque of the driven element 107 is not delivered to the motor 101 by way of a slip (or free-wheeling). Accordingly, damage to the motor 101 due to the driving torque of the driven element 107 can be prevented.

The clutch 103 is a complicated mechanical combination body. The clutch 103 includes a fork 104 and a sleeve 105, and selectively connects and blocks power delivered from the drive element 102 of the motor 101 to the driven element 107 of the rear wheel. The clutch 103 can selectively couple and decouple the drive element 102 and the driven element 107 through the sleeve 105 toothed with the drive element 102 and the driven element 107 by moving the fork 104 by way of actuation of an actuator 106.

However, an electric 4-wheel drive system adopting this clutch can have a negative effect on driving of the vehicle due to an impact resulting from the tooth combination of the sleeve 105. Further, a spline abrasion can be generated between the drive element 102 and the driven element 107 due to the sleeve 105.

Moreover, after synchronization control between the speed of the drive element 102 and the speed of the driven element 107 is performed, the clutch 103 is engaged and released. Accordingly, driving performance can be deteriorated due to the delay of a response time.

The above information disclosed in this Background section is only for enhancement of understanding of the background of the invention and therefore it may contain information that does not form the prior art that is already known in this country to a person of ordinary skill in the art.

SUMMARY

The present invention provides a clutch assembly for an electric 4-wheel drive system and a method of controlling the same having advantages of being capable of improving driving performance and selectively coupling and decoupling the drive element of a motor and the driven element of a rear wheel at a rapid response time.

An exemplary embodiment of the present invention provides a clutch assembly for an electric 4-wheel drive system for selectively blocking power delivered from the drive element of a motor to the driven element of a rear wheel, including i) a one-way clutch movably installed between the drive element and the driven element, ii) a fork member movably installed in a clutch housing and brought into sliding contact with the external circumference of the one-way clutch, and iii) an actuator installed in the clutch housing and configured to provide forward working force and backward working force to the fork member.

Also, in the clutch assembly for an electric 4-wheel drive system in accordance with an exemplary embodiment of the present invention, the one-way clutch may include a ratchet hinged to an inner race between an outer race and the inner race.

Further, in the clutch assembly for an electric 4-wheel drive system in accordance with an exemplary embodiment of the present invention, the fork member may be brought into sliding contact with a groove portion provided in the exterior circumference of the outer race.

Further, in the clutch assembly for an electric 4-wheel drive system in accordance with an exemplary embodiment of the present invention, the one-way clutch may be configured in a sprag method in which part of the ratchet is protruded into the interior circumference of the inner race.

Further, in the clutch assembly for an electric 4-wheel drive system in accordance with an exemplary embodiment of the present invention, the outer race and the inner race may be rotated along with the drive element and the driven element by way of the ratchet engaged with the inner race in response to the rotation of the drive element and the driven element in one direction.

Further, in the clutch assembly for an electric 4-wheel drive system in accordance with an exemplary embodiment of the present invention, the ratchet may constrain the drive shaft of the drive element and the driven shaft of the driven element disposed coaxially with the drive shaft.

Further, in the clutch assembly for an electric 4-wheel drive system in accordance with an exemplary embodiment of the present invention, the one-way clutch may be moved between the drive shaft and the driven shaft by way of the forward drive of the actuator.

Further, in the clutch assembly for an electric 4-wheel drive system in accordance with an exemplary embodiment of the present invention, the one-way clutch may be moved toward the drive shaft between the drive shaft and the driven shaft by way of the backward drive of the actuator.

Further, in the clutch assembly for an electric 4-wheel drive system in accordance with an exemplary embodiment of the present invention, the ratchet may be brought in a surface contact with exterior circumferences of the drive shaft and the driven shaft between the drive shaft and the driven shaft.

Another exemplary embodiment of the present invention provides a method of controlling an operation of the clutch assembly for an electric 4-wheel drive system for selectively blocking power delivered from the drive element of a motor to the driven element of a rear wheel, including when the drive element of the motor and the driven element of the rear wheel are sought to be coupled, determining whether torque of the drive element is smaller than or equal to torque of the driven element, if, as a result of the determination, the torque of the drive element is determined to be smaller than or equal to the torque of the driven element, moving a fork member from the drive element to the driven element by supplying an electrical signal to an actuator, and coupling the drive element and the driven element through a one-way clutch brought into sliding contact with the fork member.

Further, in the method of controlling an operation of the clutch assembly for an electric 4-wheel drive system in accordance with an exemplary embodiment of the present invention, if, as a result of the determination, the torque of the drive element is determined to be not smaller than or equal to the torque of the driven element, the motor may be decelerated.

Yet another exemplary embodiment of the present invention provides a method of controlling an operation of the clutch assembly for an electric 4-wheel drive system for selectively blocking power delivered from the drive element of a motor to the driven element of a rear wheel, including if power delivered from the drive element of the motor to the driven element of the rear wheel is sought to be blocked, determining whether torque of the drive element is greater than or equal to torque of the driven element, if, as a result of the determination, the torque of the drive element is determined to be greater than or equal to the torque of the driven element, moving a fork member from the driven element to the drive element by supplying an electrical signal to an actuator, and releasing a connection between the drive element and the driven element through a one-way clutch brought into sliding contact with the fork member.

Further, in the method of controlling an operation of the clutch assembly for an electric 4-wheel drive system in accordance with an exemplary embodiment of the present invention, if, as a result of the determination, the torque of the drive element is determined to be not greater than or equal to the torque of the driven element, the motor may be accelerated.

In exemplary embodiments of the present invention, since the drive element of the motor and the driven element of the rear wheel can be selectively coupled and decoupled by using the one-way clutch, the tooth combination structure of a sleeve as in a prior art can be obviated.

Accordingly, in an exemplary embodiment of the present invention, since the tooth combination structure, such as a spline, can be removed from the clutch coupling portion of the drive element and the driven element, an impact due to the coupling and decoupling of the clutch can be reduced, the emotional driving of a vehicle can be improved, and the durability of the drive element and the driven element can be improved.

Moreover, in an exemplary embodiment of the present invention, the one-way clutch can be smoothly moved and the drive element and the driven element can be coupled and decoupled depending on a torque condition of the drive shaft of the drive element and a torque condition of the driven shaft of the driven element. Accordingly, synchronization control between the speed of the drive element and the speed of the driven element is not necessary.

Accordingly, in an exemplary embodiment of the present invention, the deterioration of driving performance due to the delay of a response time by an actuator can be prevented.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

BRIEF DESCRIPTION OF THE DRAWINGS

The following drawings are illustrated in order to refer to a description of some exemplary embodiments of the present invention, and the technical spirit of the present invention should not be construed as being limited to the accompanying drawings.

DETAILED DESCRIPTION OF THE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify a description of the present invention, parts not related to the description are omitted, and the same reference numbers are used throughout the drawings to refer to the same or like parts. Further, a description of parts which may be easily understood by those skilled in the art is omitted.

The size and thickness of each of elements shown in the drawings are randomly illustrated for convenience of description and thus the present invention is not limited to those shown in the drawings. In the drawings, a thickness is enlarged in order to clearly show several parts and areas.

Further, in the following detailed description, terms denoting the names of elements, such as the first and the second, are provided to distinguish the elements from each other because the elements have the same construction, and the elements are not limited to corresponding order in the following description.

In the entire specification, unless explicitly described to the contrary, the word "comprise" and variations such as "comprises" or "comprising", will be understood to imply the inclusion of stated elements but not the exclusion of any other elements.

Further, each of terms, such as '... unit", "... means', '... part', and '... member' described in the specification, mean a unit of a comprehensive element that performs at least one function or operation.

Figure 2:
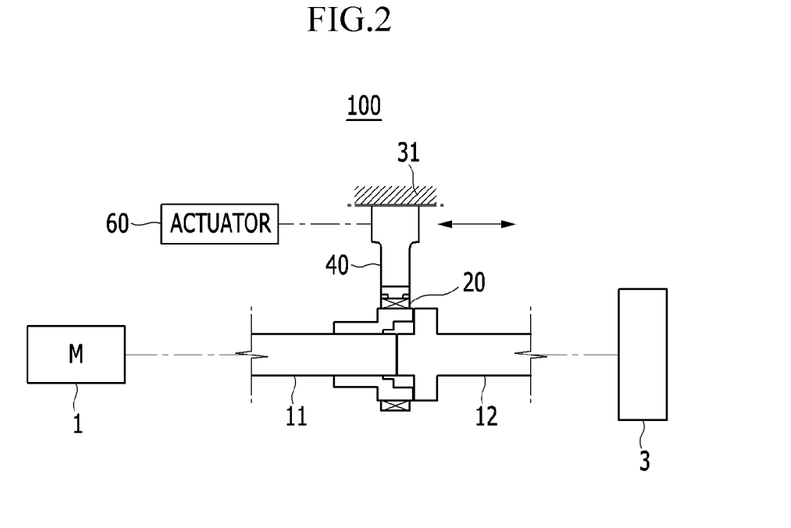
FIG. 2 is a diagram schematically showing the clutch assembly for an electric 4-wheel drive system in accordance with an exemplary embodiment of the present invention.

FIG. 2 is a diagram schematically showing a clutch assembly for an electric 4-wheel drive system in accordance with an exemplary embodiment of the present invention.

Referring to FIG. 2, a clutch assembly 100 can be applied to an electric 4-wheel drive system for driving a rear wheel 3 by way of rotary power of a motor 1 in a vehicle using a conventional drive method of driving a front wheel by the power of an engine.

Here, a vehicle using a front engine front-wheel drive which adopts the electric 4-wheel drive system includes an electric generator for converting mechanical energy, that is, the redundant power of the engine, into electrical energy on the front wheel side.

In particular, the electric 4-wheel drive system can be applied to a hybrid vehicle using the rotary power of the engine as main power, and using the rotary power of the motor 1 driven by electrical energy as auxiliary power.

The electric 4-wheel drive system of the present invention can drive the rear wheel 3 by the rotary power of the motor 1 in a vehicle using a front engine front-wheel drive, and can secure escape and climbing performance in a low speed section when a slip is generated in the front wheel. For example, the electric 4-wheel drive system can be an in-line type in which the rotary power of the motor 1 is distributed over the rear wheels 3 on the left and right sides through a power delivery apparatus by way of one motor 1. As an alternative, the electric 4-wheel drive system may be an in-wheel motor type in which the motor 1 is installed in each of the rear wheels 3 on the left and right sides and the rotary power of the motors 1 are supplied to the rear wheels 3 through the power delivery apparatus.

The clutch assembly 100 in accordance with the present invention can be applied to an electric 4-wheel drive system having the in-line type or the in-wheel motor type. The clutch assembly 100 is configured to selectively connect and block rotary power delivered from the drive element 11 of the motor 1 to the driven element 12 of the rear wheel 3. In particular, the clutch assembly 100 can couple, and thus combines the drive element 11 of the motor 1 and the driven element 12 of the rear wheel 3 in an acceleration condition and regenerative braking deceleration condition of a vehicle.

Further, the clutch assembly 100 can block power delivered from the drive element 11 of the motor 1 to the driven element 12 of the rear wheel 3 by releasing a connection between the drive element 11 and the driven element 12 in an acceleration condition and deceleration condition having a reference speed or higher of a vehicle.

In an exemplary embodiment of the present invention, the drive element 11 can be defined as a drive shaft driven and rotated by the rotary power of the motor 1, and the driven element 12 can be defined as a driven shaft driven and rotated by the rotary power delivered from the drive element 11. Preferably the drive shaft and the driven shaft are disposed coaxially, and a gear, such as a spline, may not be formed in the exterior circumference of an end where the drive shaft and the driven shaft are coupled.

The clutch assembly 100 of an electric 4-wheel drive system in accordance with an exemplary embodiment of the present invention can provide suitable driving performance of a vehicle, and the clutch assembly 100 is configured to selectively couple and decouple the drive element 11 of the motor 1 and the driven element 12 of the rear wheel 3 at a rapid response time. To this end, the clutch assembly 100 of the electric 4-wheel drive system in accordance with an exemplary embodiment of the present invention includes a one-way clutch 20, a fork member 40, and an actuator 60.

Figure 3:
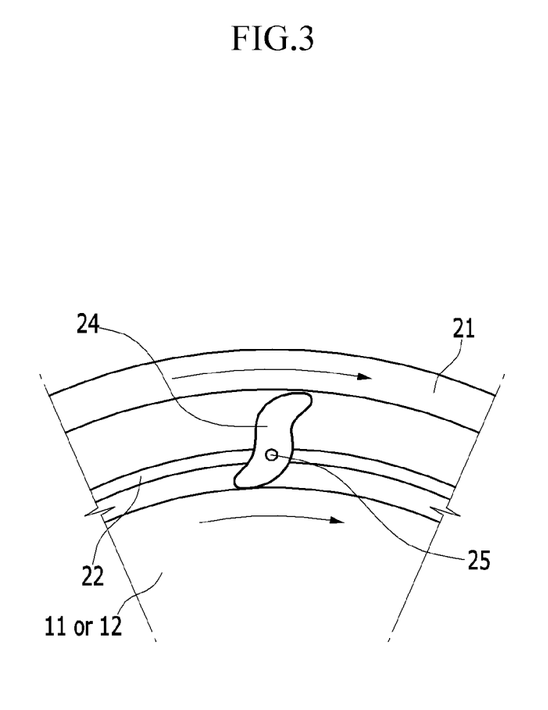
FIG. 3 is a diagram showing a construction of a one-way clutch applied to the clutch assembly for the electric 4-wheel drive system of FIG. 2.
Figure 4:
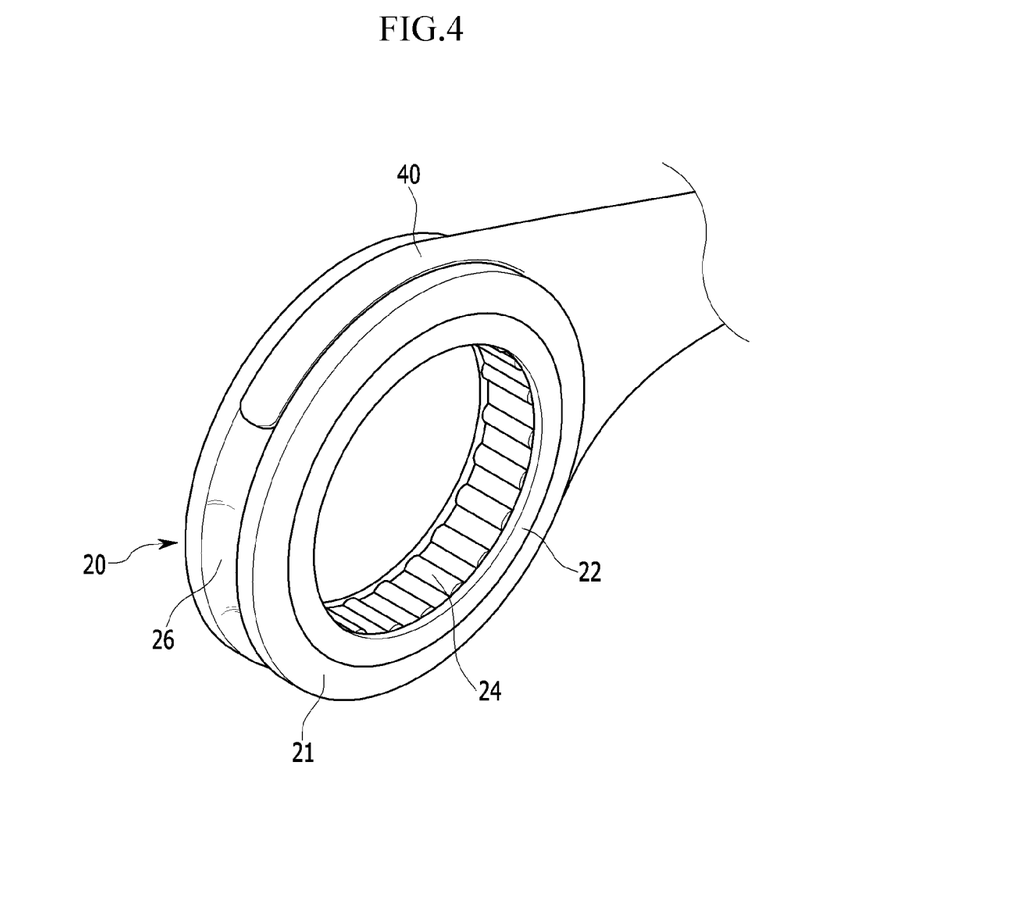
FIG. 4 is a diagram showing the coupling structure of a fork member and the one-way clutch applied to the clutch assembly of FIG. 3.

FIG. 3 depicts the one-way clutch 20 applied to the clutch assembly for an electric 4-wheel drive system in accordance with an exemplary embodiment of the present invention, and FIG. 4 depicts the coupling structure of the fork member 40 and the one-way clutch 20 applied to the clutch assembly.

Referring to FIGS. 3 and 4, in an exemplary embodiment of the present invention, the one-way clutch 20 is movably installed between the drive shaft of the drive element 11 and the driven shaft of the driven element 12. The one-way clutch 20 includes an outer race 21 and an inner race 22. The one-way clutch 20 further includes a ratchet 24 hinged to the inner race 22 between the outer race 21 and the inner race 22. The ratchet 24 can be combined with the inner race 22 by way of a hinge pin 25.

As provided herein, the one-way clutch 20 can be configured in a sprag method in which part of the ratchet 24 is protruded into the interior circumference of the inner race 22. Preferably, in the one-way clutch 20, a groove portion 26 is formed in the exterior circumference of the outer race 21 along a circumference direction thereof. In the one-way clutch 20, the outer race 21 and the inner race 22 can be rotated along with the drive shaft of the drive element 11 and the driven shaft of the driven element 12 by way of the ratchet 24 engaged with the inner race 22 in response to the rotation of the drive shaft of the drive element 11 and the driven shaft of the driven element 12 in one direction.

Therefore, the ratchet 24 can constrain the drive shaft of the drive element 11 and the driven shaft of the driven element 12. In particular, the ratchet 24 can have a surface contact with the exterior circumference of the drive shaft and with the exterior circumferences of the drive shaft and the driven shaft between the drive shaft and the driven shaft. The one-way clutch 20 constructed as above in accordance with an exemplary embodiment of the present invention can be moved between the drive shaft of the drive element 11 and the driven shaft of the driven element 12 by means of the forward drive of the actuator 60 to be described in detail later. Further, the one-way clutch 20 can be moved toward the drive shaft between the drive shaft and the driven shaft by means of the backward drive of the actuator 60.

Preferably the fork member 40 functions to move the one-way clutch 20. The fork member 40 is movably installed in a clutch housing 31 (as shown in FIG. 2) and is combined with the exterior circumference of the outer race 21 of the one-way clutch 20 in a sliding contact way. The fork member 40 is installed in the groove portion 26 of the outer race 21 in a sliding contact way.

As shown in FIG. 2, the actuator 60 functions to provide forward working force and backward working force to the fork member 40. The actuator 60 is installed in and fixed to the clutch housing 31, and is connected to the fork member 40. For example, the actuator 60 can include a cylinder device for driving an actuation rod forward or backward by means of hydraulic pressure or pneumatic pressure, or a solenoid device for driving the actuation rod forward or backward in response to an electrical signal. The actuator 60 preferably is formed of an actuating device, which is well known in the art to which the present invention pertains, and thus a detailed description of the actuator 60 is omitted in this specification.

A method of controlling the operation of the clutch assembly 100 for an electric 4-wheel drive system in accordance with an exemplary embodiment of the present invention is described below with reference to the accompanying drawings.

Figure 5A:
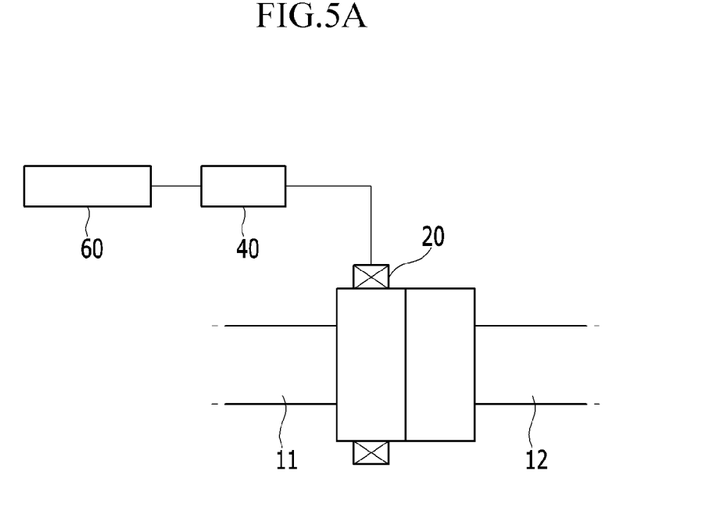
FIGS. 5A and 5B are diagrams illustrating a method of controlling the operation of the clutch assembly for an electric 4-wheel drive system in accordance with an exemplary embodiment of the present invention.
Figure 5B:
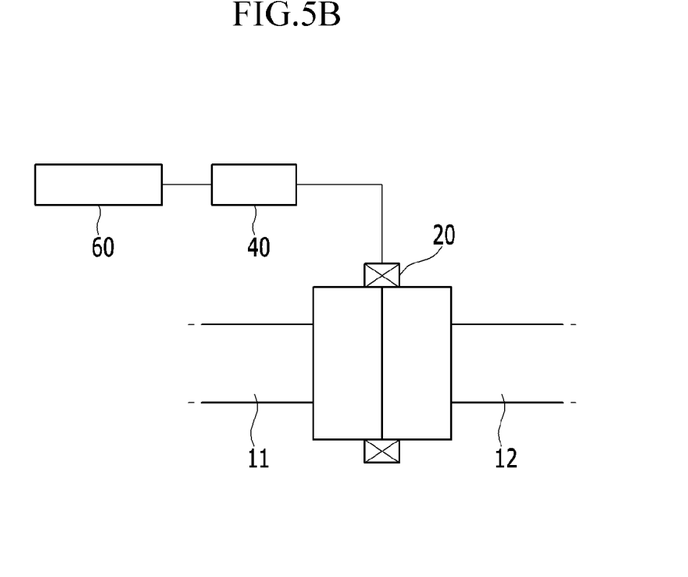
Figure 6A:
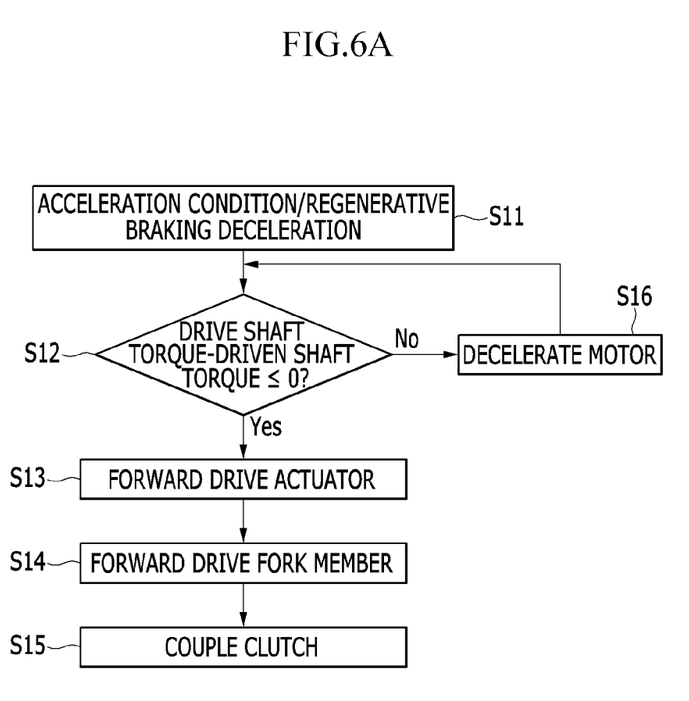
FIGS. 6A and 6B are flowcharts illustrating a method of controlling the operation of the clutch assembly as shown in FIGS. 5A-5B.
Figure 6B:
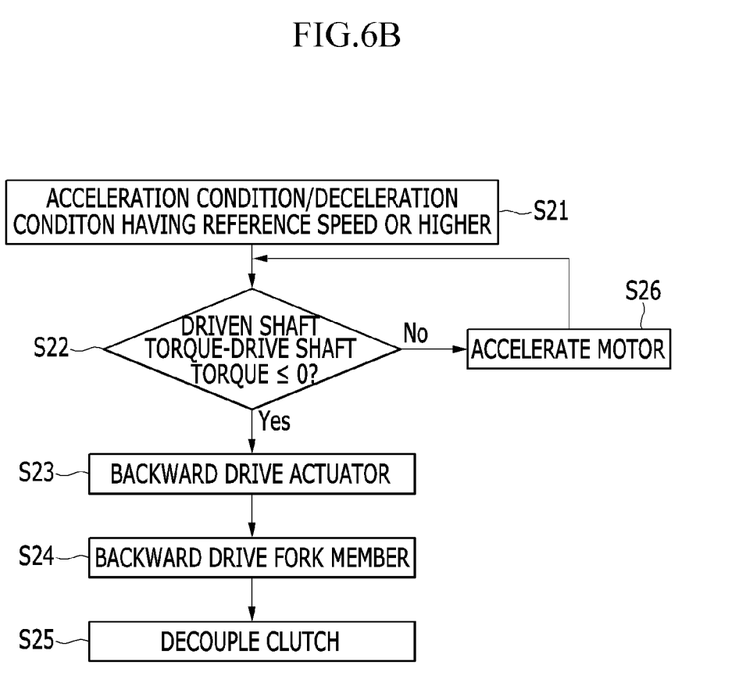

FIGS. 5A and 5B are diagrams illustrating a method of controlling the operation of the clutch assembly for an electric 4-wheel drive system in accordance with an exemplary embodiment of the present invention, and FIGS. 6A and 6B are flowcharts illustrating a method of controlling the operation of the clutch assembly for an electric 4-wheel drive system in accordance with an exemplary embodiment of the present invention.

As shown in FIG. 5A, the one-way clutch 20 constrains the exterior circumference of the drive shaft of the drive element 11 when the fork member 40 moves toward the drive shaft of the drive element 11 by way of the backward drive of the actuator 60. In particular, the ratchet 24 of the one-way clutch 20 is brought into surface contact with the exterior circumference of the drive shaft, and the outer race 21 and the inner race 22 are rotated along with the drive shaft in response to the rotation of the drive shaft in one direction by way of the ratchet 24 engaged with the inner race 22. As a result, power delivered from the drive element 11 to the driven element 12 can be blocked by releasing the connection between the drive element 11 of the motor 1 and the driven element 12 of the rear wheel 3.

In this state, in an acceleration condition and a regenerative braking deceleration condition of a vehicle at step S11 as shown in FIG. 6A, if the drive element 11 of the motor 1 and the driven element 12 of the rear wheel 3 are sought to be coupled, a controller (not shown) determines whether torque of the drive shaft of the drive element 11 is less than or equal to torque of the driven shaft of the drive element 12 at step S12. As provided herein, the torque of the drive shaft of the drive element 11 and the torque of the driven shaft of the drive element 12 can be sensed and measured by a torque sensor (not shown), which is well known in the art.

If, as a result of the determination at step S12, the torque of the drive shaft of the drive element 11 is determined to be less than or equal to the torque of the driven shaft of the drive element 12, the actuator 60 is forward driven by supplying an electrical signal to the actuator 60 at step S13, as shown in FIG. 5B.

In response to the forward drive of the actuator 60, the fork member 40 connected to the actuator 60 is moved in a forward direction from the drive shaft of the drive element 11 to the driven shaft of the driven element 12 at step S14. In particular, the one-way clutch 20 is located between the drive shaft and the driven shaft by means of the fork member 40.

Accordingly, the ratchet 24 of the one-way clutch 20 is brought into surface contact with the exterior circumferences of the drive shaft and the driven shaft between the drive shaft and the driven shaft. As a result, the outer race 21 and the inner race 22 are rotated along with the drive shaft and the driven shaft while constraining the drive shaft and the driven shaft by way of the ratchet 24 engaged with the inner race 22.

Accordingly, in an exemplary embodiment of the present invention, the drive element 11 of the motor 1 and the driven element 12 of the rear wheel 3 are coupled by the one-way clutch 20, and thus the rotary power of the drive element 11 can be delivered to the driven element 12 at step S15.

If, as a result of the determination at the step S12, the torque of the drive shaft of the drive element 11 is determined to not be less than or equal to the torque of the driven shaft of the drive element 12, then the above steps are performed in the state in which the motor 1 has been decelerated at step S16.

In particular, the reason why the coupling operation of the one-way clutch 20 is started depending on a torque condition of the drive shaft of the drive element 11 and a torque condition of the driven shaft of the drive element 12, as described above, is for smoothly moving the one-way clutch 20 and coupling the drive element 11 and the driven element 12 through the one-way clutch 20 without an impact.

Meanwhile, in the state in which the drive element 11 of the motor 1 and the driven element 12 of the rear wheel 3 are coupled as described above, in the case of an acceleration condition and a deceleration condition having a reference speed or higher of a vehicle at step S21 as shown in FIG. 6B, a controller (not shown) determines whether torque of the drive shaft of the drive element 11 is greater than or equal to torque of the driven shaft of the drive element 12 at step S22.

If, as a result of the determination at the step S22, the torque of the drive shaft of the drive element 11 is determined to be greater than or equal to the torque of the driven shaft of the drive element 12, the actuator 60 is driven in a backward direction by supplying an electrical signal to the actuator 60 at step S23.

In this state, referred to FIG. 5B, in response to the backward drive of the actuator 60, the fork member 40 connected to the actuator 60 is backward moved toward the drive shaft between the drive shaft of the drive element 11 and the driven shaft of the driven element 12 at step S24, as in FIG. 5A. In particular, the one-way clutch 20 is placed on the drive shaft of the drive element 11 by means of the fork member 40.

In an exemplary embodiment of the present invention, the power delivered from the drive element 11 of the motor 1 the driven element 12 of the rear wheel 3 can be blocked by releasing the connection between the drive element 11 and the driven element 12 at step S25.

If, as a result of the determination at the step S22, the torque of the drive shaft of the drive element 11 is determined to be not greater than or equal to the torque of the driven shaft of the drive element 12, then the above steps are performed in the state in which the motor 1 has accelerated at step S26.

In particular, the reason why the decoupling operation of the one-way clutch 20 is started depending on a torque condition of the drive shaft of the drive element 11 and a torque condition of the driven shaft of the drive element 12, as described above, is for smoothly moving the one-way clutch 20 and coupling the drive element 11 and the driven element 12 through the one-way clutch 20 without an impact.

In accordance with the clutch assembly 100 of an electric 4-wheel drive system and the method of controlling the operation of the same according to exemplary embodiments of the present invention, the tooth combination structure of a sleeve, as described with reference to the related art, can be improved upon, because the drive element 11 of the motor 1 and the driven element 12 of the rear wheel 3 can be selectively coupled and decoupled by using the one-way clutch 20.

Accordingly, in an exemplary embodiment of the present invention, since a tooth combination structure, such as a spline, is not utilized in the clutch coupling portion of the drive element 11 and the driven element 12, an impact due to the coupling and decoupling of the clutch can be reduced, drive performance of a vehicle can be improved, and the durability of the drive element 11 and the driven element 12 can be improved.

Moreover, in an exemplary embodiment of the present invention, the one-way clutch 20 can be smoothly driven depending on a torque condition of the drive shaft of the drive element 11 and a torque condition of the driven shaft of the drive element 12, and the drive element 11 and the driven element 12 can be coupled and decoupled. Accordingly, synchronization control between the speed of the drive element 102 and the speed of the driven element 107 is not necessary.

Accordingly, in an exemplary embodiment of the present invention, the deterioration of driving performance due to the delay of a response time in the actuator can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clutch assembly for an electric 4-wheel drive system for selectively blocking power delivered from a drive element of a motor to a driven element of a rear wheel, the clutch assembly comprising:
a one-way clutch movably installed between the drive element and the driven element;
a fork member movably installed in a clutch housing and brought into sliding contact with an external circumference of the one-way clutch; and
an actuator installed in the clutch housing and configured to provide forward working force and backward working force to the fork member,
wherein the one-way clutch comprises a ratchet hinged to an inner race between an outer race and the inner race,
wherein the one-way clutch is configured in a sprag method in which part of the ratchet is protruded into an interior circumference of the inner race,
wherein the ratchet constrains a drive shaft of the drive element and a driven shaft of the driven element disposed coaxially with the drive shaft and the one-way clutch is moved between the drive shaft and the driven shaft by way of a forward drive of the actuator,
wherein the ratchet is brought in a surface contact with exterior circumferences of the drive shaft and the driven shaft between the drive shaft and the driven shaft.

2. The clutch assembly of claim 1, wherein the fork member is brought into sliding contact with a groove portion provided in an exterior circumference of the outer race.

3. The clutch assembly of claim 1, wherein the outer race and the inner race are rotated along with the drive element and the driven element by way of the ratchet engaged with the inner race in response to the rotation of the drive element and the driven element in one direction.

4. The clutch assembly of claim 1, wherein if torque of the drive element of the motor is smaller than or equal to torque of the driven element, the fork member is moved from the drive element to the driven element by supplying an electrical signal to the actuator, and the drive element and the driven element are coupled through the one-way clutch brought into sliding contact with the fork member.

5. A clutch assembly for an electric 4-wheel drive system for selectively blocking power delivered from a drive element of a motor to a driven element of a rear wheel, the clutch assembly comprising:
a one-way clutch movably installed between the drive element and the driven element;
a fork member movably installed in a clutch housing and brought into sliding contact with an external circumference of the one-way clutch; and
an actuator installed in the clutch housing and configured to provide forward working force and backward working force to the fork member,
wherein the one-way clutch comprises a ratchet hinged to an inner race between an outer race and the inner race,
wherein the one-way clutch is configured in a sprag method in which part of the ratchet is protruded into an interior circumference of the inner race,
wherein the ratchet constrains a drive shaft of the drive element and a driven shaft of the driven element disposed coaxially with the drive shaft and the one-way clutch is moved between the drive shaft and the driven shaft by way of a forward drive of the actuator,
wherein the one-way clutch is moved toward a drive shaft between the drive shaft and a driven shaft by way of a backward drive of the actuator,
wherein the ratchet is brought in a surface contact with exterior circumferences of the drive shaft and the driven shaft between the drive shaft and the driven shaft.

6. The clutch assembly of claim 5, wherein if torque of the drive element is greater than or equal to torque of the driven element, the fork member is moved from the driven element to the drive element by supplying an electrical signal to the actuator, and a connection between the drive element and the driven element is released through the one-way clutch brought into sliding contact with the fork member.

7. The clutch assembly of claim 5, wherein the fork member is brought into sliding contact with a groove portion provided in an exterior circumference of the outer race.

8. The clutch assembly of claim 5, wherein the outer race and the inner race are rotated along with the drive element and the driven element by way of the ratchet engaged with the inner race in response to the rotation of the drive element and the driven element in one direction.

9. The clutch assembly of claim 5, wherein when torque of the drive element of the motor is less than or equal to torque of the driven element, the fork member is moved from the drive element to the driven element by supplying an electrical signal to the actuator, and the drive element and the driven element are coupled through the one-way clutch brought into sliding contact with the fork member.

* * * * *